(12) United States Patent
Schmidt et al.

(10) Patent No.: US 8,495,672 B2
(45) Date of Patent: Jul. 23, 2013

(54) METHOD AND DEVICE FOR SUPPLYING DATA

(75) Inventors: Christian Thorge Schmidt, Hamburg (DE); Arndt-Helge Grap, Hamburg (DE)

(73) Assignee: Radiopark GmbH & Co. KG, Hamburg (DE)

( * ) Notice: Subject to any disclaimer, the term of this patent is extended or adjusted under 35 U.S.C. 154(b) by 1244 days.

(21) Appl. No.: 12/012,782

(22) Filed: Feb. 4, 2008

(65) Prior Publication Data

US 2008/0189333 A1      Aug. 7, 2008

(30) Foreign Application Priority Data

Feb. 5, 2007   (DE) .......................... 10 2007 006 432

(51) Int. Cl.
*G06F 17/30* (2006.01)
*H04N 7/16* (2006.01)

(52) U.S. Cl.
USPC ............... 725/25; 725/31; 725/98; 386/239; 386/248; 386/314; 386/353; 348/14.12; 348/156; 707/705

(58) Field of Classification Search
USPC  707/705; 386/239, 248, 314, 353; 348/14.12, 348/156; 725/25, 31, 87, 98, 115
See application file for complete search history.

(56) References Cited

U.S. PATENT DOCUMENTS

| | | | | |
|---|---|---|---|---|
| 5,689,507 A | * | 11/1997 | Bloks et al. | .................... 370/389 |
| 6,895,170 B1 | * | 5/2005 | Lambert et al. | ................ 386/248 |
| 2001/0037507 A1 | * | 11/2001 | Mori | ............................... 725/97 |
| 2002/0081095 A1 | * | 6/2002 | Van Den Enden | ............... 386/68 |
| 2002/0157103 A1 | * | 10/2002 | Song et al. | ........................ 725/97 |
| 2003/0070174 A1 | * | 4/2003 | Solomon | .......................... 725/98 |
| 2003/0167250 A1 | * | 9/2003 | Sash | .................................. 707/1 |
| 2004/0139482 A1 | * | 7/2004 | Hale et al. | ...................... 725/135 |

(Continued)

FOREIGN PATENT DOCUMENTS

| | | |
|---|---|---|
| WO | WO 00/27124 A1 | 5/2000 |
| WO | WO 00/49807 A1 | 8/2000 |
| WO | WO 01/15428 A1 | 3/2001 |
| WO | WO 01/50759 A2 * | 7/2001 |

OTHER PUBLICATIONS

Olivier Steiger et al, MPEG-Based Personalized Content Delivery, IEEE, 2003.*

(Continued)

*Primary Examiner* — Philip Chea
*Assistant Examiner* — Shanto M Abedin
(74) *Attorney, Agent, or Firm* — Kilpatrick Townsend & Stockton LLP (57) ABSTRACT

A method of transmitting and providing data includes the steps: providing data units in a memory of a base device, providing a reference set for each data unit, in which at least one individual identification is different for each data set, producing an order sequence of the data units which determines a succession of individual identifications, producing a time-allocation table for each order sequence, transmitting to and storing on a user device a plurality of data units, at least one order sequence and the time-allocation table or tables associated with the latter from the base device, reading out a time of day from a user clock associated with the user device, determining the execution moment allocated to the time of day on the basis of the time-allocation table, and providing the data unit allocated to the execution moment on the basis of the order sequence.

30 Claims, 4 Drawing Sheets

U.S. PATENT DOCUMENTS

2005/0098023 A1    5/2005   Toivonen et al.
2005/0232612 A1*  10/2005   Lambert et al. ............... 386/125
2005/0272405 A1*  12/2005   Tomlinson et al. ........ 455/404.2
2006/0212444 A1    9/2006   Handman et al.
2007/0198468 A1*   8/2007   Berger .............................. 707/2
2008/0010119 A1*   1/2008   Oliveira et al. ................. 705/14

OTHER PUBLICATIONS

Zhang, Liang-Jie et al.; "A Per-object-granularity Tracking Mechanism for Interactive TV Viewership Estimation and Program Rating"; 2002, *Proceedings of the IEEE Fourth International Symposium on Multimedia Software Engineering*, 8 pages.

* cited by examiner

METHOD AND DEVICE FOR SUPPLYING DATA

This application claims the priority of German Patent Application No. 10 2007 006 432.4-31, filed Feb. 5, 2007, the disclosure of which is incorporated herein by reference.

The invention concerns a method of and an apparatus for transmitting and providing data to a user.

The transmission and provision of data is usually required when data are to be transmitted from a base device, such as for example a server, to a user device, such as for example a personal computer or a mobile data storage and provision medium, and are to be made available on that user device. The term providing data is used in this context to indicate making the data available in processed form, for example in the form of a visual and acoustic reproduction of texts defined by the data, in the form of an acoustic reproduction of audio data defined by the data or in the form of a visual reproduction of video data defined by the data.

Various systems are available in the state of the art for such transmission and provision of data. Thus on the one hand it is known for the field of use of mobile audio playback devices for the audio data to be transmitted from a base device to the mobile device. It is further known in that use for playback sequences for the audio data to be determined on the base device or the mobile device and for the audio data then to be provided upon reproduction thereof in succession in accordance with the playback sequence predetermined in that way, and consequently reproduced. A disadvantage of that method is that the user has to program the playback sequences on the base device or the user device itself and, in the event of multiple repeated selection of a playback sequence once programmed, receives a continuously recurring succession of the same audio data files. In order to counteract the monotonousness which occurs in that way, it is known for the audio data to be provided in a random succession. That admittedly obviates the monotonousness of the programmed sequences but the random succession means for example for the situation involving audio data that data units are played back in succession, which do not harmonise in stylistic or rhythmic terms or in some other fashion, and consequently the result is an overall non-harmonic succession of the audio data.

It has also long been known for audio data to be transmitted by a broadcasting organisation to a radio receiver and, in a fashion which is the same in principle, it is known for video data to be transmitted to a television receiver, as the user device. In that case the data which are to be provided by the user device and which are to be reproduced are transmitted to the user device in a sequence which is predetermined in the broadcasting organisation, and are reproduced in the user device in precisely that sequence. That transmission and provision method however suffers from a series of disadvantages. On the one hand the quantity of data to be transmitted is high as the audio or video data which are to be made available to the user always have to be transmitted in real time, even if data which for example have already been sent at an earlier moment in time or sent on a different transmission channel are to be reproduced. Furthermore, the provision of the data is dependent on the transmission of the data in real time and, in the event of a temporary interruption in transmission, for example due to climatic influences or in the case of mobile devices due to temporary geographical obstacles or obstacles caused by buildings in the data transmission path, the provision of the data breaks down and therewith also reproduction of the data, and the audio or video reproduction is interrupted or at least seriously disturbed.

The object of the invention is to provide a method of transmitting and providing data which allows highly diverse and varied provision of data and is insensitive in relation to temporary disturbances and interruptions in the data transmission.

That object is attained by a method of transmitting and providing data, comprising the steps:

providing data units in a base main data memory of a base device, providing a reference set for each data unit, in which there is contained at least one individual identification which is different for each data unit, producing an order sequence of the data units which determines a succession of a plurality of individual identifications on the basis of predetermined criteria inputted by an administrator or by a user, producing a time-allocation table for each order sequence, wherein at least one predetermined time of day, preferably a predetermined time of day at a predetermined date is allocated in the time-allocation table to each execution moment of the succession of data units determined in the order sequence by the individual identifications and at least one time of day or an execution moment is allocated in the time-allocation table to each data unit, transmitting a plurality of data units, at least one order sequence and the time-allocation table or tables associated with the latter from the base device to a user device, storing the plurality of data units, the at least one order sequence and the time-allocation table or tables associated with the latter on the user device, reading out a time of day and optionally a date from a user clock associated with the user device, determining the execution moment allocated to the time of day and optionally the date on the basis of the time-allocation table, and providing the data unit allocated to the execution moment on the basis of the order sequence.

The method according to the invention is based on a different principle of data preparation in the base device, a different kind of transmission of the data and a different way of processing the data in the user device. In accordance with the invention firstly a plurality of data units are transmitted from the base device to the user device. In that respect a data unit can be for example an audio data file or a video file with a given reproduction duration. That transmission of the data units can take place within a short period of time. After reception by the user device the data units are physically stored in the user device. Subsequently an order sequence and a time-allocation table related to that order sequence are transmitted from the base device. The order sequence and the time-allocation table can also be combined in a single table. A predetermined series of individual identifications are contained in the order sequence. Each individual identification refers to a data unit allocated thereto, with a corresponding individual identification. Thus, a sequence in which the data units are to be provided is established on the basis of the order sequence. A time of day and optionally a date are determined in the time-allocation table for each execution moment of the sequence which is predetermined in that way. In that respect that time association is so selected that the order sequence starts at a given moment in time and optionally a date with the first data unit and thereupon is run through in the provided sequence, thereby affording a chronological association of the execution time with the progressing time of day.

The order sequence and the time-allocation table are also transmitted from the base device to the user device in a short period of time and stored in the user device.

In accordance with the invention the user device has a clock which specifies the time of day and optionally a date. If a user of the user device would like to start reproduction of the data units on the basis of the order sequence, the corresponding execution moment in the order sequence is ascertained on the basis of the time-allocation table, by means of the time of day specified by the clock of the user device, and then the data unit arising out of the order sequence for that execution moment is provided at the location corresponding for the execution moment, for example in order to reproduce it for the user.

In that way the method according to the invention permits the user the impression of a current radio program of the day if the data involve audio files or a current television program of the day if they are video data. In that respect however for the method according to the invention, contrary to the known methods, for radio and television programs, there is no need to maintain a permanent data transmission between the broadcasting station and the radio or television. Instead it is sufficient if, at a moment in time which is far before the actual moment of access to the data, the data units, the order sequence and the time-allocation table were transmitted once within a short time and were stored on the user device. In addition the method according to the invention makes it possible to transmit a plurality of different order sequences and time-allocation tables associated therewith, and to store same, and in that way to provide either different programs for one and the same day or programs for different days. In addition the method according to the invention makes it possible to provide data units in multiple relationship, insofar as they are included in an order sequence a plurality of times or in a plurality of order sequences, without for that purpose any need to transmit a data unit more than once. Instead, upon each availability of the data unit which has been transmitted once, access is had to the data unit which is already stored in the user device, whereby the quantity of data transmission can be significantly reduced. Finally the method according to the invention also makes it possible to keep the stock of data units on the user device up-to-date by regular updates and in that way to provide a continuous up-to-date program by suitably assembled order sequences.

The method according to the invention is suitable for a large number of uses. Thus it can be effectively used on the one hand as a service of a service provider in relation to end users who would like to have a varied and daily up-to-date audio or television program presented to them on their user device, which is assembled and transmitted by a supplier from a base device. Furthermore it is advantageous in uses in which commercial users would like to receive an entertainment program which is matched to the purposes of their own customers and in that respect would like to have access to the service of a commercial supplier of such entertainment programs.

In accordance with a first preferred embodiment the data units prior to transmission to the user device are encrypted in such a way that it is possible to access them only by way of the user device, in particular only by means of an order sequence transmitted to the user device. A problem which arises with any kind of data transmission is ensuring copyright protection for the data, which is endangered if multiplication and propagation of the data were possible without any impediment. The method according to the invention offers the optional security in that respect of encrypting the data units which enjoy copyright protection in such a way that they can be accessed only from an order sequence which contains their individual identification. In that way the frequency of reproduction of the data units can be precisely predetermined and checked and consequently uncontrolled repeated reproduction on the user device can be avoided. At the same time the user data or order sequences can also be encrypted in such a way that they can only be used on that user device to which they were transmitted so that it is also possible in that way to counteract unhindered propagation of the data units which are the subject of copyright protection.

It is particularly preferred if an order sequence and the time-allocation table associated therewith are combined in an order+time-allocation table in order in that way to arrive at a compact data format.

It is further preferred if the data units, order sequence or sequences and time-allocation table or tables are transmitted wirelessly. Wireless transmission, for example by way of a terrestrial or satellite-supported radio network (GSM, GPRS, WLAN, DVD-T, S-band satellite, digital radio) on the one hand is available as a data transmission technology which is already well-established and thus can be used directly for the invention while on the other hand by virtue of the small quantities of data which are to be transmitted for the method according to the invention it is capable of providing data on the user device at a higher level of quality than with the known real-time transmission and provision methods.

In that respect it is particularly preferred if the data units, order sequence or sequences and/or time-allocation table or tables are transmitted as a packet multiplex signal. Contrary to known real-time transmission and reproduction procedures, transmission by means of a packet multiplex signal can be used for the method according to the invention without any limitation as the transmission and reproduction method according to the invention is not reliant on implementing simultaneous provision of data and the playback sequence thereof at each moment in time of the data transmission. Instead of that, in accordance with the method according to the invention, firstly the data units themselves can be transmitted as a bundled packet without any kind of data sequence of the data units being contained in that respect in the transmitted items of information. After that packet has been sent one or more order sequences with corresponding time-allocation tables can then be transmitted, whereby a reproduction option is afforded on the user device similarly to the real-time transmission and reproduction of conventional radio and television programs. The method according to the invention is therefore particularly suitable for broadband, short-term transmission of all items of information required for provision of the data on the user device, to the user device, with a consequential option of completely interrupting the transmission without the reproduction on the user device being restricted thereby.

In that respect it is particularly preferred if the data units, the order sequence or sequences and the time-allocation table or tables are successively transmitted.

In particular the method according to the invention preferably makes it possible that the data units, order sequence or sequences and/or time-allocation table or tables are transmitted in a transmission period which is shorter than the reproduction period that acoustic and/or graphic reproduction of audio or video data defined by the data units requires. In this respect the term reproduction in accordance with the invention is used to denote a consumable reproduction rate in the sense of a real-time reproduction of the data units, that is to say the transmitted data units as audio data or video data are reproduced to the user in such a form that he can consume them in the intended playback time. That development makes it possible for the user to receive the data units, order sequences and time-allocation tables transmitted to his device, when using a short transmission time, for example a few minutes, between the base device and the user device, which is adequate for a reproduction time that exceeds the transmission time, for example of 24 hours.

It is further preferred that the time-allocation table includes an allocation of the start times of the data units in accordance with the order sequence to the days of time and the execution moment at which data provision begins is ascertained by the following steps:

ascertaining that start time which most closely precedes the clock time provided by the user clock by association of the start times contained in the time-allocation table with the clock time,     ascertaining the data unit associated with that start time on the basis of the time-allocation table and the order sequence,     ascertaining the data unit running time which has elapsed from the start time, in relation to the clock time provided by the user clock, by subtraction of the start time from the clock time, and     associating the moment in the order sequence, that corresponds to the elapsed running time, with the execution moment.

Consequently this development provides on the one hand that the quantity of data to be stored in the time-allocation table is considerably reduced as it is only necessary to still store the start times of the individual data units in accordance with the order sequence and a moment of time of day has to be allocated to each start time. Accordingly, it is also only necessary to provide for association with that time of day or the execution moment corresponding thereto in the order sequence of the corresponding data unit. On the other hand that execution moment at which the provision of data, that is to say for example reproduction of the audio data, begins, is ascertained in such a way that the execution time exactly corresponding to the clock time provided by the user clock is used for that purpose. That achieves perfect simulation of a chronologically occurring, remotely transmitted program as an execution moment can also be selected or determined in the middle of a data unit by that kind of data provision.

As an alternative to that development a further development of the method according to the invention can provide that the time-allocation table includes an allocation of the start times of the data units in accordance with the order sequence to the times of day and the execution moment at which data provision begins is ascertained by the following steps:

ascertaining that start time which is closest to the clock time provided by the user clock by association of the start times contained in the time-allocation table with the clock time,     ascertaining the data unit associated with that start time on the basis of the time-allocation table and the order sequence, and     providing said data unit from its start time in the order sequence.

That development avoids a data unit being made available in the middle thereof, that is to say incompletely, with the omission of components which have already elapsed at the time of day. Instead of that, provision of the data units always begins at a start moment and for that purpose the execution moment which is afforded by calculation from the time-allocation table is rounded to the nearest start moment, whereby the execution moment selected for provision of the data is either put forward or back.

In that respect it is preferred if that start time is ascertained, which most closely precedes the clock time provided by the user clock. That provides that the execution moment is always put forward and this therefore ensures that, in dependence on the clock time at which the user calls for provision of the data, the user does not move in the order sequence before the time of day deriving from the time-allocation table but always trails behind the actual time of day, or, in the event where the time of day at which the user calls on provision of the data units exactly corresponds to a start moment in the time-allocation table, runs precisely synchronously therewith.

In accordance with a further preferred embodiment of the invention it is provided that ratings inputted by the user by way of a user interface of the user device are logically linked to a data unit, an individual identification, the order sequence and/or a time in the time-allocation table and the order sequence is altered in dependence on said ratings. In accordance with the invention it is provided that the order sequence and the time-allocation table are produced on a base device and consequently are compiled for example by a service provider in accordance with the ideas thereof. For better adaptation of that service and for individualisation of the service offered however it is advantageous if the individual taste of one or more users can also be taken into account when compiling the data units in the order sequences. That is made possible by this development of the invention. In that respect the ratings inputted by the user can be used on the one hand internally in the user device to select order sequences, to modify selected order sequences or the like.

It is however particularly preferred if the ratings inputted by the user are transmitted to the base device and are taken into consideration by the base device in selection of the data units listed in the order sequence. In that way it is now possible on the one hand for the rating of the individual user to be taken into consideration when producing an order sequence intended for him in the future. In addition it is now also possible for the rating of a plurality of users to be taken into consideration when producing order sequences. Finally, the ratings of a large number of or all users of the method according to the invention can be used to produce a ranking list in which the data units are classified on the basis of their ratings in order to determine therefrom for example the residence time of the data units in the base device and in the user devices, to adapt the purchase price of individual data units to the demand, or the like.

In accordance with a further preferred embodiment the items of information required for the purchase of a data unit are transmitted between the user device and the base device. The method according to the invention is suitable not only for providing data units for reproduction on the user device, but also for providing on the user device data units for free use by the user. In the latter case the user is granted more extensive rights to the data units, thus for example also multiple reproduction, transmission to other reproduction devices and the like. Those use rights are usually linked to a purchase price. It is therefore preferred if the base device and the user device can exchange the items of information which are required for the payment of such a purchase price and for corresponding extension of the use rights to the data units. Those items of information involve in particular items of information which identify the data unit selected for purchase, for example on the basis of the individual identification thereof, an identification of the purchaser and possibly information concerning the payment means to be used for payment of the purchase price. It is particularly advantageous with this development of the invention that the data units are already physically stored on the user device and thus, after the purchase has been completed, only have to be suitably enabled for more extensive use.

It is further preferred if the user can provide a data unit with a purchase marking and, in order to make the corresponding data unit freely accessible to the user, the purchase marking is immediately transmitted to the base device or said purchase marking is stored on the user device until there is a connection to the base device and the purchase marking is then transmitted to the base device to complete the purchase. An advantage of the method according to the invention is that of permitting provision of the data and reproduction which is possible therefrom on the user device in the order sequence independently of a permanent connection to the base device. In order also to permit completion of the purchase of a data unit independently of a permanent data connection to the base device, it is advantageous for the items of information which have to be exchanged between the base and user devices for the purchase to be exchanged immediately in the case of an existing data connection and for a purchase marking associated with the data unit to be purchased to be stored on the user device in the event that no data connection exists and for the items of information required for completion of the purchase to be transmitted between the base device and the user device at a later time when a data connection exists.

In addition, in the two aforementioned developments with information exchange for completion of the purchase of one or more data units, it is advantageous, insofar as the data units are transmitted to the user device in encrypted form in accordance with the above-described embodiment, if enablement of the purchased data units is effected by modifying and in particular cancelling the encryption of the corresponding data units. As described hereinbefore an advantage of the method according to the invention is that the data units are already physically arranged on the user device. Enablement of the purchased data units, which is to be concluded after payment of the purchase price, can therefore be effected in particular by cancelling encryption of those data units whereby the data units are made available to the user for more extensive use and for more extensive ways of using them.

It is further preferred if data units, an order sequence or sequences and/or a time-allocation table or tables are transmitted between a first and a second user device. In that way transmission of the data units, order sequences and time tables, for example in order to provide for updating a user device to a more up-to-date version, can be effected not only when a data connection to the base device exists but also when that user device is in data communication with another user device which has a more up-to-date data status. In that respect the data transmission can be wired but in particular wireless, for example by way of Bluetooth. In that way what are referred to as 'mutual social updates' can be made between individual user devices and, upon corresponding spread of the user devices, a data version which is always up-to-date can be achieved on each of the user devices insofar as individual ones of those user devices have been continuously updated by data connection to the base device with a correspondingly up-to-date version.

In addition it is preferred for the method according to the invention to be developed by the features that a first number of data units and a first order sequence with a first time-allocation table corresponding thereto are transmitted, wherein the first order sequence contains exclusively individual identifications of data units of the first number of data units, and a second number of data units and a second order sequence with a second time-allocation table corresponding thereto are transmitted, wherein the second order sequence contains individual identifications of data units of the first and second numbers of data units. It is possible with that developed configuration of the invention to adapt user devices continuously to up-to-date developments in respect of the data units and the order sequences, insofar as only the modified data units or data units which have freshly appeared are transmitted and order sequences which contain individual identifications of those modified or freshly appeared data units are transmitted. Transmission can be effected in that respect in particular at two different moments in time. The development of the invention is thus to be interpreted as meaning that a user device can be continuously up-dated at later times by the transmission of corresponding new data units and order sequences with time-allocation tables. In that respect, besides the storage of new data units and order sequences, it is in particular also provided that given data units, order sequences and time-allocation tables, for example those which have exceeded a given residence time on the user device or such data units which in accordance with one of the aforementioned embodiments have received negative or no positive ratings, are removed from the user device by an erase instruction which is transmitted from the base device to the user device in order in that way to achieve meaningful management of the storage space available on the user device.

It is further preferred if data units are provided on the base device and transmitted with a specific identification or tag to the user device, and the user can configure the provision of the data units on the user device in such a way that data units with a specific identification are made available to him immediately after reception thereof by the user device instead of one or more data units provided in accordance with the order sequence. In that way the user can provide for and have reproduction of given data units independently of the order sequence which is just taking place, immediately after the transmission thereof. Thus for example data units which contain up-to-date news information can be reproduced immediately for the user. In addition by suitable identifications the user can choose a specifically targeted selection of the data units and thus, by way of the selection of one or more identifications ('tags'), can immediately arrange for reproduction only of those data units which concern his geographical region, his field of work or the like.

In that respect, in particular for certain uses, it may be preferable if data units are provided on the base device and transmitted with a special urgency identification or tag to the user device and that data units with that specific urgency identification are provided for the user independently of the individual configuration of the user device immediately after the reception thereof by the user device instead of one or more data units provided in accordance with the order sequence. In that way, independently of the individual configuration of the user device of the individual users, certain data units which are to be brought immediately to the notice of all users can be provided and reproduced immediately irrespective of the order sequence which is just selected at that time. That is suitable for example for immediately disseminating up-to-date warning messages or indications of risk.

In accordance with a further preferred embodiment at least one attribute is associated with each data unit and stored in the reference set of the data unit and an order instruction is transmitted from the base device to the user device or is inputted by the user, which causes the base device to compile data units with a given attribute together in an order sequence and to provide same for the user in that order sequence. In that way it is possible on the basis of the order instruction to produce an order sequence on the user device itself from the data units which are stored on the user device. Thus for example data units which concern a given theme or audio data of a given genre, a given tempo or a given artist can be selected by such an attribute and compiled in an order sequence.

In that respect it is particularly preferred if stored in the reference set of one or more data units is a positive or negative arrangement instruction which contains items of information
which data unit that data unit must follow in an order sequence,
which data unit that data unit may not follow in an order sequence,
which data unit must follow that data unit in an order sequence, and/or
which data unit may not follow that data unit in an order sequence.

By virtue of that procedure, it is possible by means of the attribute association to prevent two data units which do not harmonise with each other (negative attribute allocation) from being arranged in succession in the order sequence, or it can be provided that two data units which harmonise particularly well with each other are always played back one after the other and in a given sequence (positive attribute association). In that fashion what are referred to as virtual attribute-based order sequences can be produced from the available data units or a selection therefrom.

It is further preferred if a plurality of order sequences and time-allocation tables associated therewith are transmitted to the user device and stored in the user device, wherein the order sequences differ from each other in respect of the data units compiled therein and the user can select an order sequence to be provided by inputting a parameter by way of a user interface of the user device. In that way the user is provided with a large number of different order sequences, from which he can select an order sequence in accordance with his current requirements.

A further aspect of the invention is an apparatus for transmitting and providing data as set forth in claim 23. The apparatus is particularly suitable for being operated in accordance with the above-described method and the developments thereof. In regard to the apparatus and the developments of the apparatus recited in claims 23 through 32 attention is directed to the corresponding, above-described developments of the method, in respect of the advantages and mode of operation involved.

A further aspect of the invention is a computer program product which, when it runs on a base device, executes the steps required on the part of the base device for implementation of the above-described method, as well as a computer program product which, when it runs on a user device, executes the steps required for implementation of the above-described method on the part of the user device. The corresponding programming of the base and user devices can be effected by separate computer program products or there can be provided a computer program product which, when it is run on the base device and when it is run on the user device, executes the respective method steps required there for the method according to the invention.

Finally a further aspect of the invention is a user device which is programmed for implementation of the method according to the invention and a base device which is programmed for the implementation of the method according to the invention.

A preferred embodiment of the method according to the invention is described with reference to the accompanying Figures in which.

Figure 1:
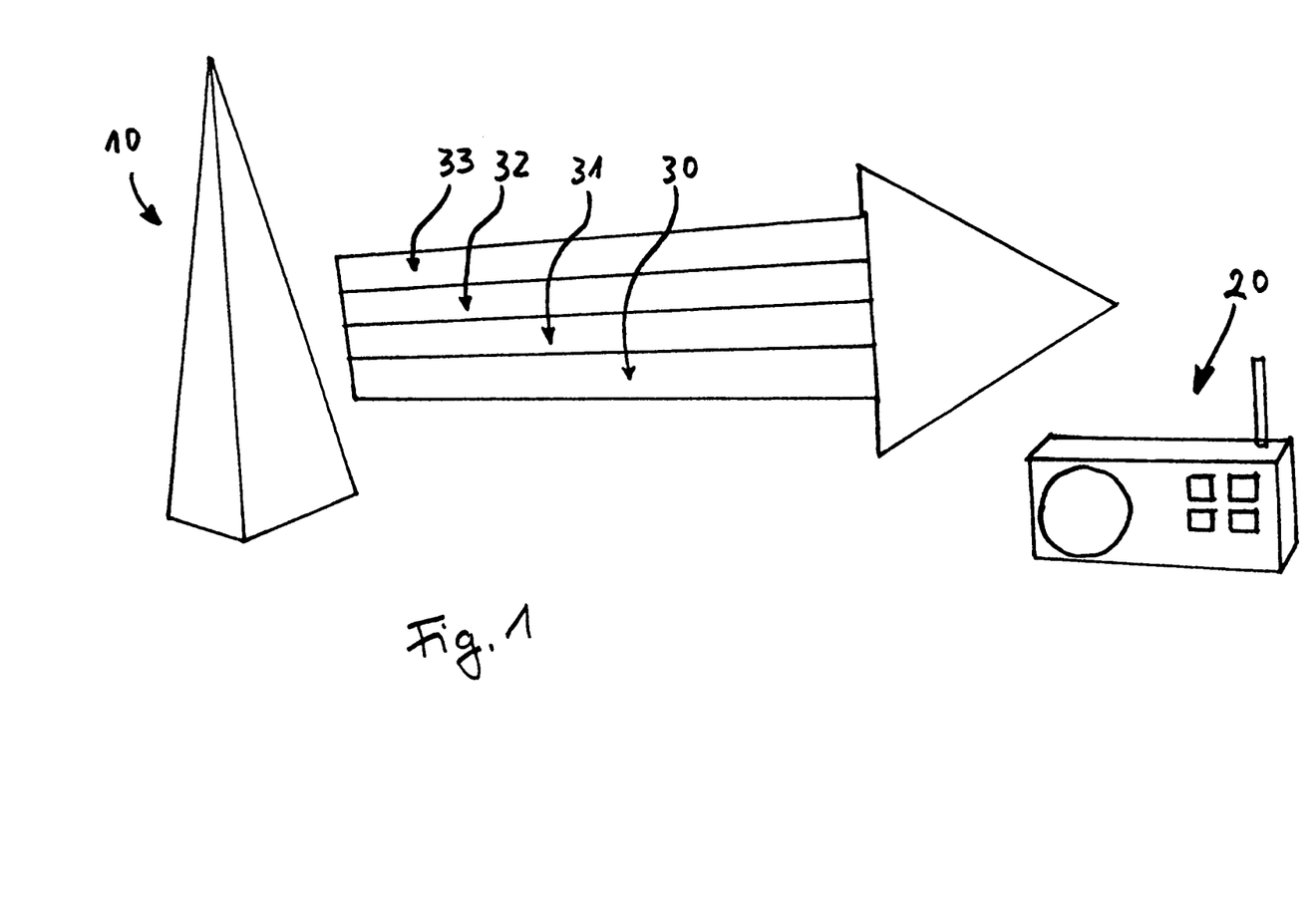
FIG. 1 shows a diagrammatic view of a conventional transmission method.

Referring firstly to FIG. 1 shown therein is a transmission method in which data are transmitted between a base device 10 and a user device 20 by way of a total of four channels 30, 31, 32, 33 from the base device to the user device. The channels 30 through 33 can be multiplex channels which operate in accordance with the time or frequency multiplex method. To provide the data on the user device, a permanent connection between the base device and the user device is required by way of the channels 30 through 33 or at least by way of the channel which is currently provided on the user device, out of those four channels.

Figure 2:
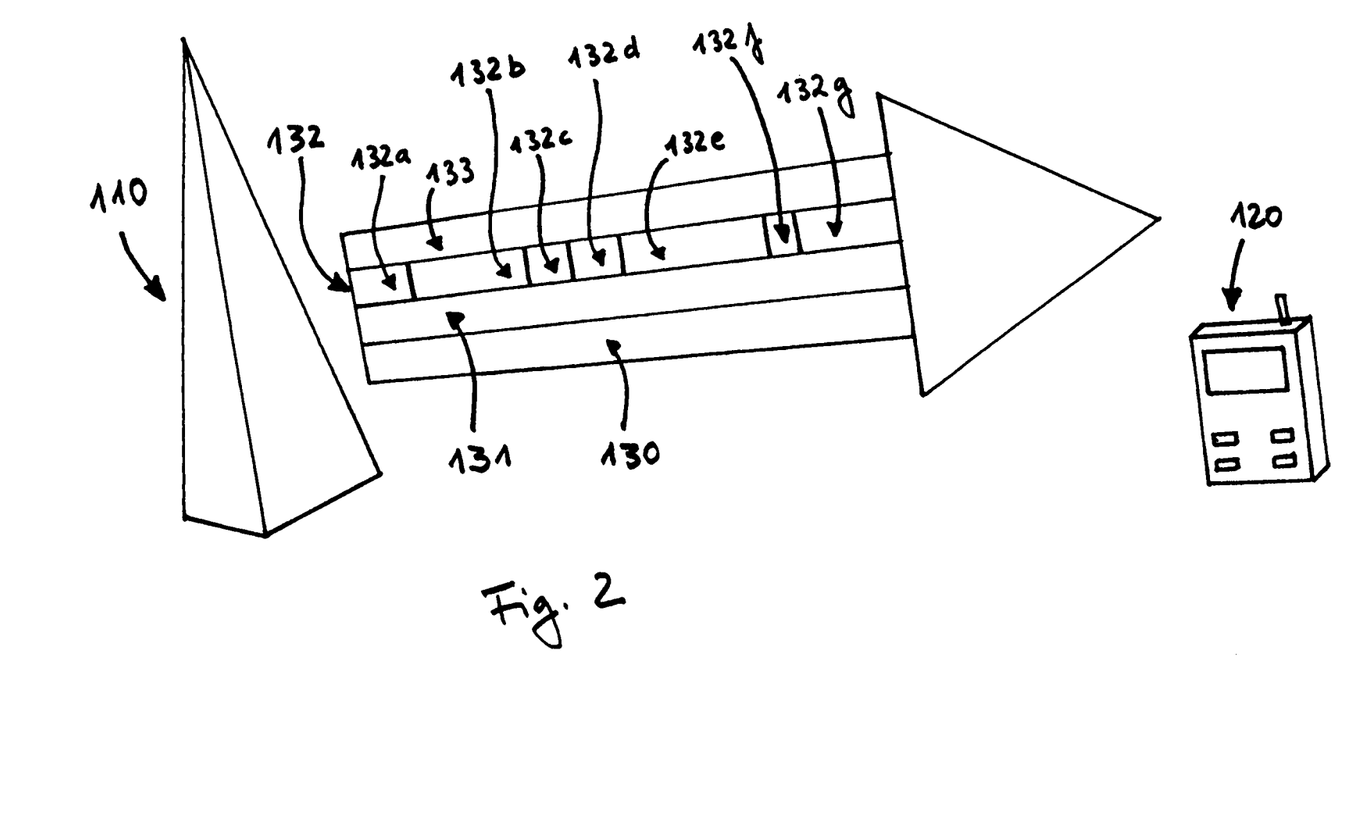
FIG. 2 shows a diagrammatic view of the embedded channel for the transmission method according to the invention.

In the transmission method shown in FIG. 2, a transmission channel 132 according to the invention is embedded in the transmission channels, in the transmission path between a base device 110 according to the invention and a user device 120 according to the invention. Packet sequences are transmitted in a packet multiplex method in the transmission channel 132 according to the invention. In that respect the individual packets 132a-g may represent either packets with data units, packets with order sequences or time-allocation tables which for provision of the data units on the user device have to be transmitted thereto.

Figure 3:
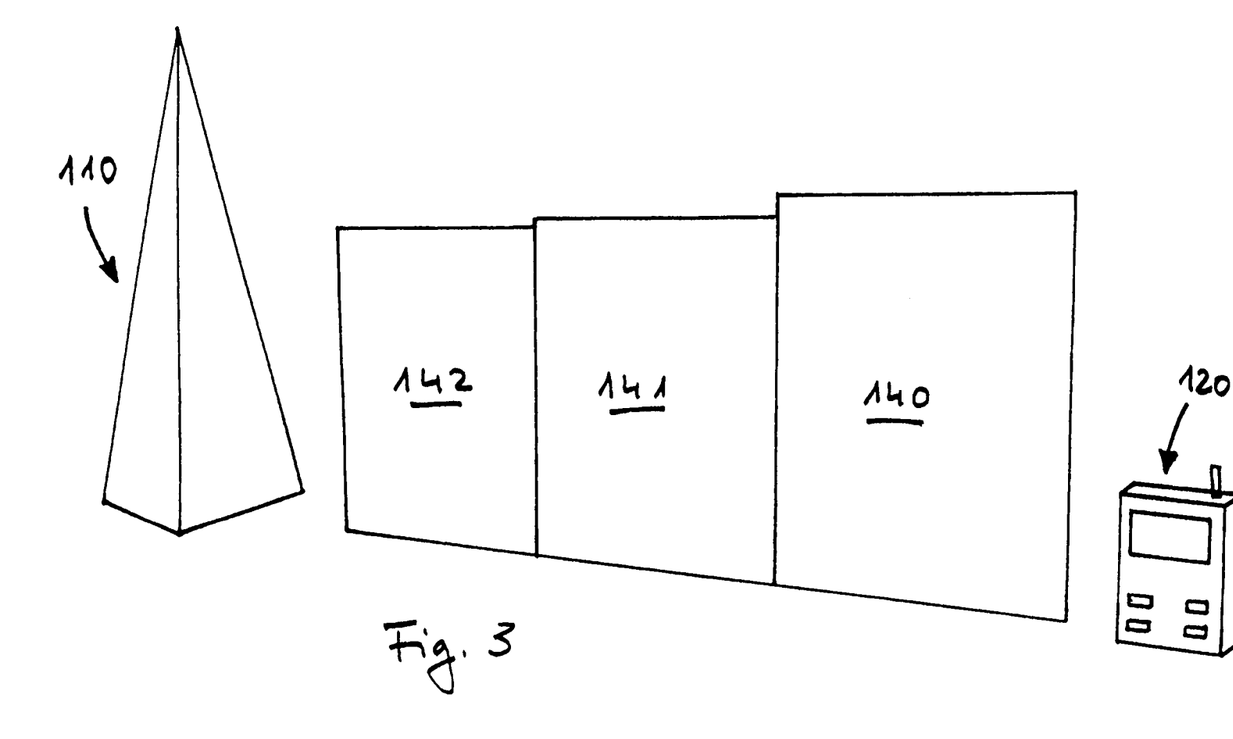
FIG. 3 shows a diagrammatic view of the transmission method according to the invention.

Reference will now be made to FIG. 3 to describe a further aspect of the transmission method according to the invention. In accordance with this aspect a first block 140 is transmitted between the base device 110 and the user device 120, the block 140 containing data units, order sequences and time-allocation tables in accordance with a first status which represents the current status in relation to a given date.

At a later moment in time an update block 141 is transmitted between the base device 110 and the user device 120, the update block containing data units, order sequences and time-allocation tables which reproduce the status representing the current status at that later time. Furthermore that update block 141 may contain erase instructions which cause certain data units, order sequences and time-allocation tables on the user device to be erased from the first block 140, for example to provide storage space for the additionally arriving data from the update block 141.

In a similar fashion, at a further later moment in time, a second update block 142 can be sent from the base device to the user device in order once again to cause updating of the data on the user device and possibly erasure of data which are no longer current.

Figure 4:
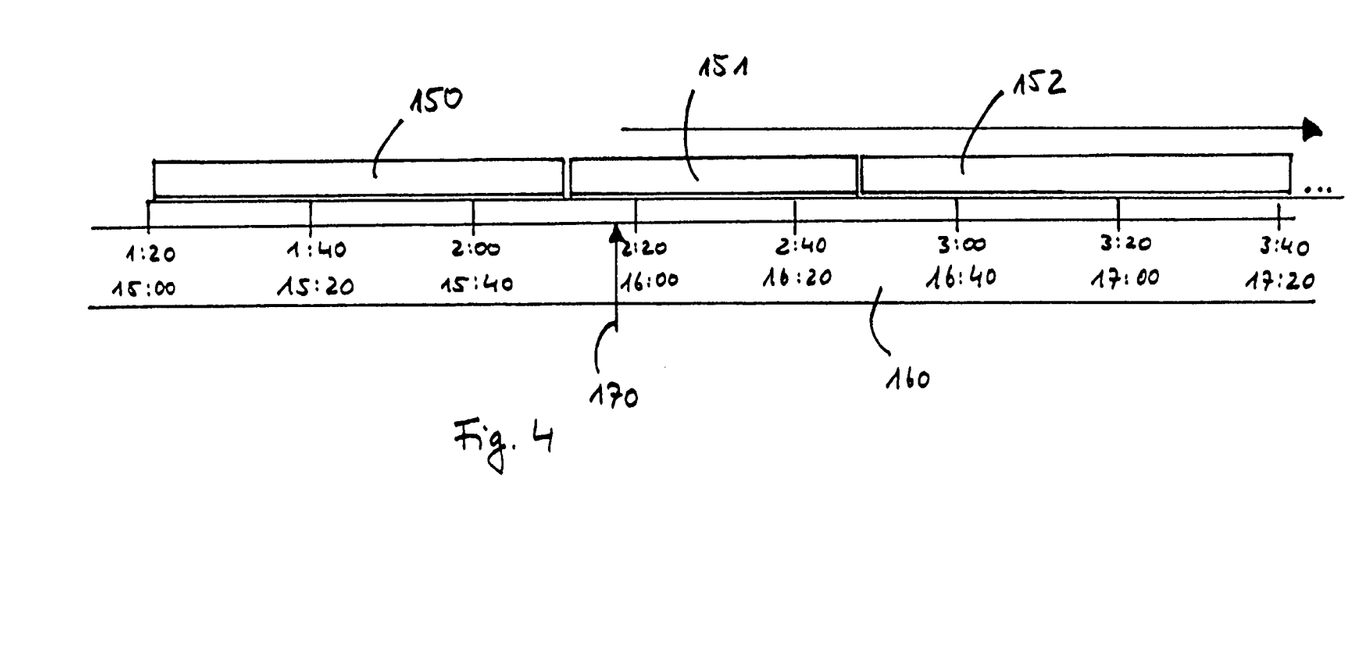
FIG. 4 shows a diagrammatic view of the provision of the data in accordance with the method of the invention.

FIG. 4 shows the time-discrete provision of the data units on the user device in diagrammatic form. FIG. 4 shows a portion of three data units 150, 151, 152 from a successive combination of a plurality of data units which are determined by individual identification of the individual data units in an order sequence. In the illustrated embodiment the three data units 150, 151, 152 are three audio files which respectively represent music titles which are self-contained so that the order sequence in this case corresponds to a playlist of the music titles.

Arranged along the succession of the music titles 150 through 152 is a playback time bar 160 which extends from left to right and which links playback times to a time-of-day bar extending parallel thereto and consequently allocates each point of the playback time to a given time of day.

If at a given time of day the user requests reproduction of the time-allocation table, the playback time is ascertained from the time-allocation table on the basis of the time of day and the entry location into reproduction is determined in that fashion. In the case of the time of day 160 therefore the procedure involves the reproduction entry location marked by the arrow 170 in FIG. 4 so that the music title 151 is reproduced for the user as the current title shortly after its beginning and the music title 152 would be subsequently reproduced. The music title 150 has already played at the selected time of day and in that case is not reproduced for the user.

The invention claimed is:

1. A method of transmitting and providing data, comprising the steps of:
provinding data units in a base main data memory of a base device,
providing a reference set for each data unit, in which there is contained at least one individual identification which is different for each data unit,
producing an order sequence of the data units which determines a succession of a plurality of individual identifications on the basis of predetermined criteria inputted by an administrator or by a user,
producing a time-allocation table for each order sequence, wherein at least one predetermined time of day at a predetermined date is allocated in the time-allocation table to each execution moment of the succession of data units determined in the order sequence by the individual identifications and at least one time of day or an execution moment is allocated in the time-allocation table to each data unit,
transmitting a plurality of data units, at least one order sequence and the time-allocation table or tables associated with the latter from the base device to a user device,
storing the plurality of data units, the at least one order sequence and the time-allocation table or tables associated with the latter on the user device,
reading out a time of day and optionally a date from a user clock associated with the user device,
determining the execution moment allocated to the time of day and optionally the date on the basis of the time-allocation table, and
providing the data unit allocated to the execution moment on the basis of the order sequence,
characterized in that data units are provided on the base device and transmitted with a specific urgency identification to the user device and that data units with that specific urgency identification are provided for the user independently of the individual configuration of the user device immediately after the reception thereof by the user device instead of one or more data units provided in accordance with the order sequence, and
wherein the user device is configured to operate without maintaining permanent data transmission between the base device and the user device.

2. The method of claim 1, characterized in that the data units, prior to transmission to the user device, are encrypted such that it is possible to access them only by way of the user device, in particular only by means of an order sequence transmitted to the user device.

3. The method claim 1, characterized in that an order sequence and the time-allocation table associated related to that order sequence are combined in a single order+time-allocation table.

4. The method of claim 1, characterized in that the data units, order sequence or sequences and time-allocation table or tables are transmitted wirelessly.

5. The method of claim 4, characterized in that the data units, order sequence or sequences and/or time-allocation table or tables are transmitted as a packet multiplex signal.

6. The method of claim 5, characterized in that the data units, the order sequence or sequences and the time-allocation table or tables are successively transmitted.

7. The method of claim 1, characterized in that the data units, order sequence or sequences and/or time-allocation table or tables are transmitted in a transmission period which is shorter than the reproduction period that acoustic and/or graphic reproduction of audio or video data defined by the data units requires.

8. The method of claim 1, characterized in that the time-allocation table includes an allocation of the start times of the data units in accordance with the order sequence to the days of time and the execution moment at which data provision begins is ascertained by the following steps:
ascertaining that start time which most closely precedes the clock time provided by the user clock by association of the start times contained in the time-allocation table with the clock time,
ascertaining the data unit associated with that start time on the basis of the time-allocation table and the order sequence,
ascertaining the data unit running time which has elapsed from the start time in relation to the clock time provided by the user clock, by subtraction of the start time from the clock time, and
associating the moment in the order sequence, that corresponds to the elapsed running time, with the execution moment.

9. The method of claim 1, characterized in that the time-allocation table includes an allocation of the start times of the data units in accordance with the order sequence to the times of day and the execution moment at which data provision begins is ascertained by the following steps:
ascertaining that start time which is closest to the clock time provided by the user clock by association of the start times contained in the time-allocation table with the clock time,
ascertaining the data unit associated with that start time on the basis of the time-allocation table and the order sequence, and
providing said data unit from its start time in the order sequence.

10. The method of claim 9, characterized in that that start time is ascertained, which most closely precedes the clock time provided by the user clock.

11. The method of claim 1, characterized in that ratings inputted by the user by way of a user interface of the user device are logically linked to a data unit, an individual identification, the order sequence and/or a time in the time-allocation table and the order sequence is altered in dependence on said ratings.

12. The method of claim 11, characterized in that the ratings inputted by the user are transmitted to the base device and are taken into consideration by the base device in selection of the data units listed in the order sequence.

13. The method of claim 1, characterized in that items of information required for the purchase of a data unit are transmitted between the user device and the base device.

14. The method of claim 2, characterized in that enablement of the purchased data units is effected by modifying and in particular cancelling the encryption of the corresponding data units.

15. The method claim 1, characterized in that the data units, the order sequence or sequences and/or the time-allocation table or tables are transmitted between a first and a second user device.

16. The method of claim 1, characterized in that
a first number of data units and a first order sequence with a first time-allocation table corresponding thereto are transmitted, wherein the first order sequence contains exclusively individual identifications of data units of the first number of data units, and a second number of data units and a second order sequence with a second time-allocation table corresponding thereto are transmitted, wherein the second order sequence contains individual identifications of data units of the first and second numbers of data units.

17. The method of claim 1, characterized in that the data units are provided on the base device and transmitted with a specific identification to the user device, and the user can configure the provision of the data units on the user device in such a way that the data units with a specific identification are made available to him immediately after reception thereof by the user device instead of one or more data units provided in accordance with the order sequence.

18. The method of claim 1, characterized in that at least one attribute is associated with each data unit and stored in the reference set of the data unit and an order instruction is transmitted from the base device to the user device or is inputted by the user, which causes the base device to compile data units with a given attribute together in an order sequence and to provide same for the user in that order sequence.

19. The method of claim 18, characterized in that stored in the reference set of one or more data units is a positive or negative arrangement instruction, wherein the arrangement instruction contains information for each data unit of the one or more data units, identifying which of the one of more data units must precede and/or must follow the data unit, and which of the one of more data units must not precede and/or must not follow each of the one or more data units.

20. The method of claim 1, characterized in that a plurality of order sequences and time-allocation tables associated therewith are transmitted to the user device and stored in the user device, wherein the order sequences differ from each other in respect of the data units compiled therein and the user can select an order sequence to be provided by inputting a parameter by way of a user interface of the user device.

21. An apparatus for transmitting and providing data comprising:
  a base device including
    a memory having a first base storage space which is allocated to the storage of data units and a second base storage space which is associated with the storage of at least one order sequence and a time-allocation table associated with said order sequence of a plurality of data units, and
    a data management unit which co-operates with the base storage spaces and which is adapted to:
      produce on the basis of predetermined criteria or criteria inputted by a user, at least one order sequence which determines a time sequence of a plurality of the data units, and
      produce in relation to each order sequence, a time-allocation table in which allocated to each execution moment in the order sequence is at least one predetermined time of day at a predetermined date and at least one time of day or an execution moment in the time-allocation table is allocated to each data unit,
  a data transmission device for the transmission of a plurality of data units, at least one order sequence and the time-allocation table or tables associated therewith from the base device to a user device, and
  at least one user device comprising,
    a first user storage space which is allocated to the storage of the data units received from the base device,
    a second user storage space which is associated with the storage of at least one order sequence and a time-allocation table associated with a plurality of data units,
    a user clock, and
    a user data management unit which is adapted to determine on the basis of the time of day specified by the user clock, the execution moment of the corresponding order sequence that is allocated in the time-allocation table received from the base device, and accesses on the basis of the order sequence the data unit allocated to said execution moment and provides the data unit allocated to said execution moment to the user,
    characterized in that data units are capable of being provided on the base device and transmitted with a specific urgency identification to the user device and that data units with that specific urgency identification are capable of being provided for the user independently of the individual configuration of the user device immediately after the reception thereof by the user device instead of one or more data units provided in accordance with the order sequence, and
    wherein the user device is configured to operate without maintaining permanent data transmission between the base device and the user device.

22. The apparatus of claim 21 characterized by an encryption unit which is adapted to encrypt the data units prior to transmission to the user device such that it is possible to access the encrypted data units only by way of the user device, in particular only by means of an order sequence transmitted to the user device.

23. The apparatus of claim 21 characterized in that the data transmission device includes a transmitter which is connected to the base device and which by way of a radio path wirelessly transmits the data units, order sequence or sequences and time-allocation table or tables to be transmitted to a receiver connected to the user device.

24. The apparatus of claim 21 characterized in that the data transmission device is adapted to transmit the data units, order sequence or sequences and/or time-allocation table or tables as successive packets by way of a packet multiplex channel.

25. The apparatus of claim 21 characterized in that the data transmission device is adapted to transmit the data units, order sequence or sequences and/or time allocation table or tables in a transmission period which is shorter than the reproduction period that the acoustic and/or graphic reproduction of audio or video data defined by the data units requires.

26. The apparatus of claim 21 characterized in that the user device has a user interface for receiving items of information inputted by the user and the user data management unit is adapted to logically link the items of information inputted by the user with the data units, the order sequence and/or the time-allocation table and to modify the order sequence.

27. The apparatus of claim 21 characterized by a second data transmission device for the transmission of data from the user device to the base device and further characterized in that the user device has a user interface for the reception of items of information inputted by the user and the second data transmission device is adapted to transmit the information inputted by the user to the base device.

28. The apparatus of claim 21 characterized by a second data transmission device for the transmission of data from the user device to the base device and further characterized in that the user device has a user interface for the reception of items of information inputted by the user and the user data management unit is adapted to logically link the information inputted by the user to a data unit, a position of the order sequence and/or a time of day or an execution time and the second data transmission device is adapted to transmit the information inputted by the user and an identification of the data unit linked to the information, a position of the order sequence and/or a time of day or execution time to the base device.

29. The apparatus of claim 21 characterized in that the user device and the base device are adapted to exchange the items of information required for a purchase of a data unit.

30. The apparatus of claim 21 characterized by a plurality of user devices, wherein each user device has a transmitting and receiving interface in order to transmit to another user device data units, an order sequence or sequences and/or a time-allocation table or tables.

\* \* \* \* \*